United States Patent [19]

Friederichs

[11] Patent Number: 5,368,628
[45] Date of Patent: Nov. 29, 1994

[54] ARTICLES OF ULTRA FINE GRAINED CEMENTED CARBIDE AND PROCESS FOR MAKING SAME

[75] Inventor: John W. Friederichs, West Branch, Mich.

[73] Assignee: Valenite Inc., Madison Heights, Mich.

[21] Appl. No.: 993,791

[22] Filed: Dec. 21, 1992

[51] Int. Cl.$^5$ ............................................. C22C 29/08
[52] U.S. Cl. ...................................... 75/242; 75/230; 75/236; 75/239; 75/241
[58] Field of Search ................. 75/236, 241, 242, 243, 75/245, 246, 230, 239; 419/15, 18, 38, 39, 42, 49, 57, 23, 28, 48

[56] References Cited

U.S. PATENT DOCUMENTS

| | | | |
|---|---|---|---|
| 3,999,954 | 12/1976 | Kolaska | 29/128.7 |
| 4,108,098 | 8/1978 | Keeton | 112/289 |
| 4,359,335 | 11/1982 | Garner | 75/208 |
| 4,695,699 | 9/1987 | Yagii | 219/121 |
| 4,753,678 | 6/1988 | Maruyama | 75/238 |

Primary Examiner—Donald P. Walsh
Assistant Examiner—John N. Greaves
Attorney, Agent, or Firm—Bill C. Panagos

[57] ABSTRACT

An article made of an ultra fine grained cemented carbide material and a process for making the same.

7 Claims, 2 Drawing Sheets

ARTICLES OF ULTRA FINE GRAINED CEMENTED CARBIDE AND PROCESS FOR MAKING SAME

BACKGROUND OF THE INVENTION

The present invention relates to the use of ultra fine-grained cemented carbide materials as tape slitter knives for magnetic tapes. Ultra fine grained cemented carbides are especially useful for this application because they offer an attractive combination of hardness, wear resistance, strength and toughness. In addition, these materials may be ground to very fine and sharp edges, which perfectly suit the slitting requirements for magnetic tapes.

SUMMARY OF THE INVENTION

The present invention relates to the use of ultra fine grained cemented carbide as tape slitter knives for magnetic tape. The preferred material is comprised of about 6 to 15% by weight cobalt, nickel or mixtures thereof, up to about 1% by weight of a transition metal carbide selected from the group consisting of TiC, TaC, NbC, HfC, ZrC, Mo2C, VC, and mixtures thereof, with the balance being WC, wherein the WC has an ultra fine grain size below about 0.6 microns, and preferably is about 0.4 microns. The material is sinter hipped at about 1,400 degrees C., and this sinter hipping makes the cutting edge stronger and prevents chipping of the edge. The tape slitter knives made of this material may be ground to an ultra fine, sharp cutting edge which, because of the wear resistant properties of the material, allows for long life in use.

DETAILED DESCRIPTION OF THE DRAWINGS

Figure 4:
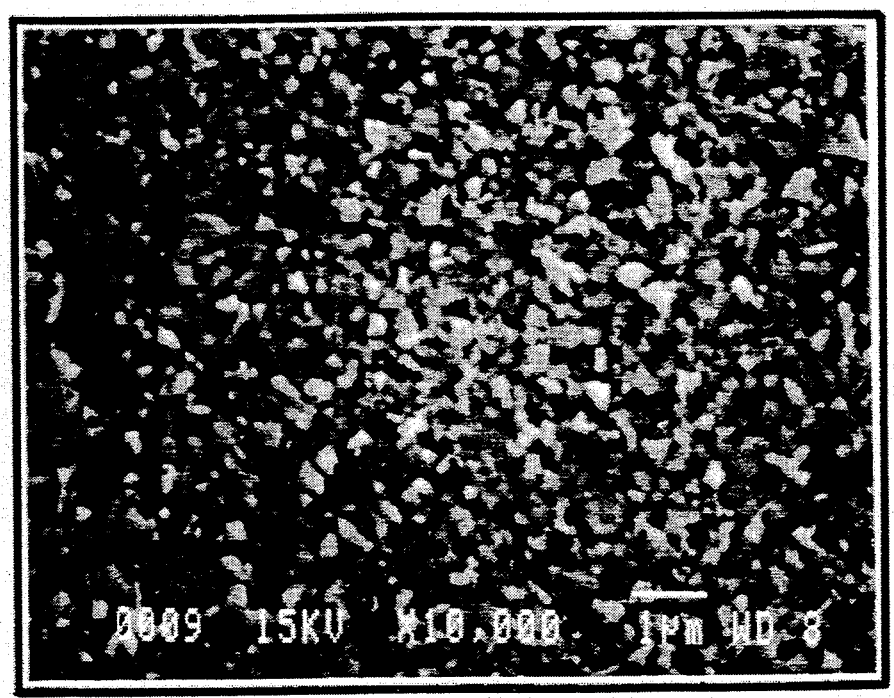
FIG. 4 is a photomicrograph of the tape slitter material showing its structure.

Turning now to the figures, wherein like numerals depict like structures, and particularly to FIG. 4, there is depicted a photomicrograph of the structure of the material used to create the tape slitter knife of the present invention. The carbide grains and cobalt grains can clearly be seen, and it should be noted that the Tungsten Carbide has an ultra fine grain structure whereby the grain size is in the range of about 0.4 to 0.6 microns, and preferably about 0.4 microns.

The ultra fine-grained cemented carbide material depicted in FIG. 4 is comprised of about 6 to 15% by weight of a ferrous metal selected from the group consisting of cobalt, nickel, or mixtures thereof, and preferably cobalt, in the range of about 8 to 12% by weight of the composition. The cemented carbide material further comprises up to about 1% by weight of a transition metal carbide selected from the group consisting of TiC, TaC, NbC, HfC, ZrC, Mo2C, VC, and mixtures thereof. Preferably, the transition metal carbides are present in an amount of about 0.5 to 0.8% by weight of the composition. Most preferably, VC is the transition metal carbide of choice. The balance of the composition is comprised of WC, wherein the WC has an ultra fine grain size below about 0.6 microns, and preferably is about 0.4 microns. The composition is sinter hipped at a temperature of about 1,400 degrees C. and the knives are formed from the resulting composition. In FIG. 4, the dark particles are the metal binder, and the lighter grain material is tungsten carbide.

Figure 1:
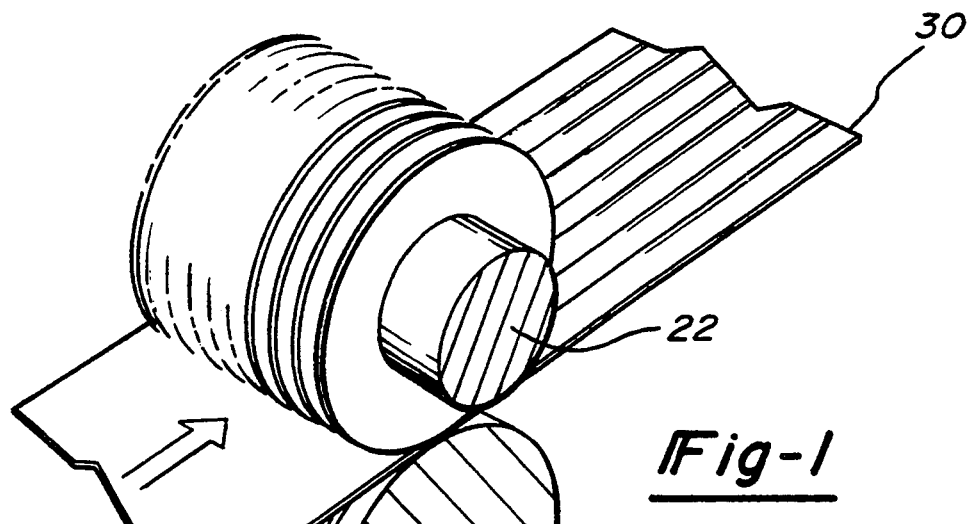
FIG. 1 is a view of a plurality of tape slitter knives in place on a machine adapted to slit magnetic tape.
Figure 2:
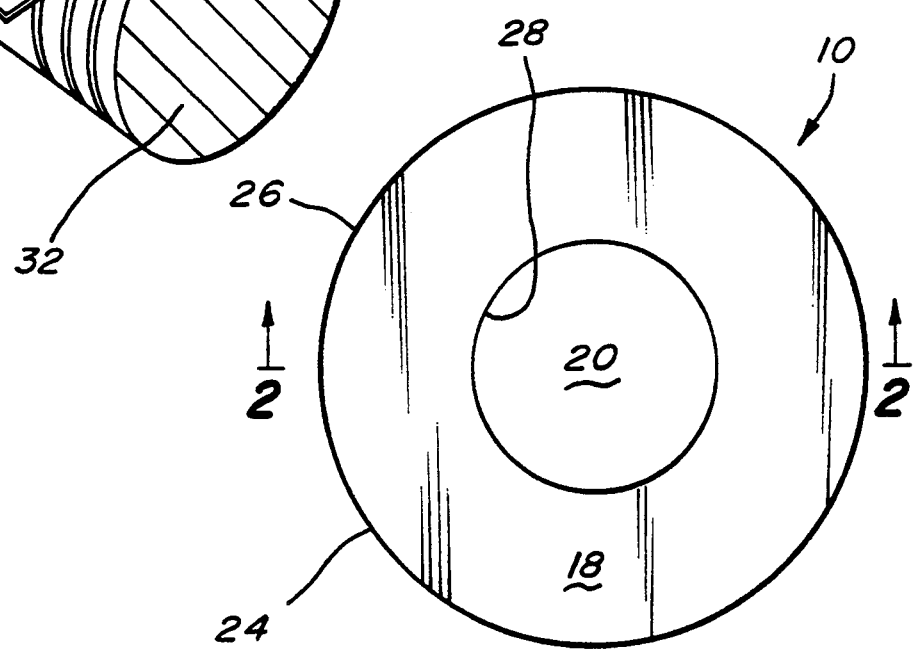
FIG. 2 is a top plan view of the tape slitter knife of the present invention.
Figure 3:
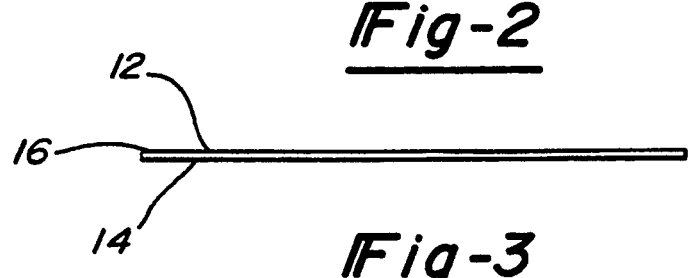
FIG. 3 is a side view of the tape slitter knife of the present invention.

Turning now to FIGS. 1 through 3, tape slitter knife 10 has substantially parallel side surfaces 12 and 14, separated by a circumferential sidewall 16 to define the body 18 of the knife. The knife has a centrally located aperture 20 extending from one side surface through the body to the opposite side surface to accommodate a spindle 22 wherein a plurality of knives are carried in the manner depicted in FIG. 1. Sidewall 16 may be sharpened in any conventional manner to a cutting edge 24. Because of the composition of the material, the cutting edge so formed is very durable and gives extraordinary life to the knife. It should be noted that the knife has an outer periphery 26, defined by the cutting edge, and an inner periphery 28, defined by the centrally located aperture in the knife.

In operation, a plurality of tape slitter knives are arranged on a spindle in parallel series with each other and magnetic tape 30 is passed via roller 32 through them. The tape is cut as it passes through the machine assembly of FIG. 1, thereby slitting the tape into the desired widths.

The tape slitter knives of the present invention, because of their composition and the ultra fine grained structure, exhibit extraordinary life under normal use conditions. The sinter hipping of the material at 1,400 degrees C. makes the cutting edge remarkably strong and prevents chipping of the edge during the sharpening operation and during use of the knife.

The tape slitter knives, and for that matter, any article to be made with this material, are made by mixing all the ingredients given above in an attritor or ball mill until thoroughly mixed. The powder mixture is then pressed in the conventional manner into the desired shaped article. This article is then placed in a furnace and sinter hipped for about 1 to 2 hours in an inert gas at an elevated pressure. The preferred gas is argon, and the preferred pressure is 700 lbs/in2. The gas is then evacuated, the article allowed to cool to room temperature and the finished article is ground to the desired shape.

The following examples are given only to illustrate certain aspects of the material of the composition. Those skilled in the art recognize that many variations are possible without departing from the scope and spirit of the invention.

EXAMPLES

The following samples were compared to determine the properties of various cobalt containing cemented carbide materials. The material was mixed thoroughly in an attritor mixer, pressed into a shape, and sinter hipped for about 2 hours at about 1,400 degrees C. in an argon atmosphere of 700 lbs/in2. Sample 1 used WC with a grain size of about 1.2 microns, Sample 2 used WC with a grain size of about 0.8 microns and Sample 3 used WC with a grain size of about 0.4 microns. All amounts shown are given in percent by weight of the composition.

|  | Sample 1 | Sample 2 | Sample 3 |
|---|---|---|---|
| Chemical Analysis: | | | |
| Cobalt | 6.0% | 10.0% | 8.0% |
| Vanadium | 0.2% | 0.5% | 0.7% |
| WC | Bal | Bal | Bal |
| Physical Properties: | | | |
| Hardness: | 93.0 | 92.8 | 94.1 |
| Hc(Oresteads) | 356 | 323 | 477 |
| Ms(EMU/gm) | 137 | 147 | 137 |
| Density(g/cm3) | 14.91 | 14.39 | 14.64 |
| TRS(KSI) | 502 Σ 32 | 654 Σ 18 | 455 Σ 106 |
| KIc(MPa·m$\frac{1}{2}$) | 8.3 Σ 0.2 | 10.2 Σ 0.4 | 9.2 Σ .03 |
| Microstructure: | | | |
| Porosity | A01 | A01 | A01 |
|  | B00 | B00 | B00 |
|  | C00 | C00 | C00 |

CONCLUSIONS

The very hardness and coercivity levels of Sample 3 are a result of the 0.4 micron WC grain used to make this sample. The fracture toughness as measured by the KIc indicates that this grade falls in between Sample 1 and Sample 2. Very low scatter in the KIc test indicated good uniformity of the microstructure.

The TRS value of Sample 1 was lower than the other Samples and the variation between the samples in this regard was greater than expected. The TRS was affected by flaw size and distribution. Without wishing to be bound to any one theory, it was felt that since the test lots were prepared under laboratory conditions, the wax distribution during the drying process may have resulted in flaws too large to be fully corrected by the sinter hipping process.

I claim:

1. An ultra fine grained cemented carbide article made by sinter hipping a composition consisting essentially of:
   (a) from about 6 to 15% by weight of a ferrous metal selected from the group consisting of cobalt, nickel or mixtures thereof;
   (b) up to about 1% by weight of a transition metal carbide selected from the group consisting of TiC, TaC, NbC, HfC, ZrC, MO2C, VC, and mixtures thereof; and
   (c) the balance consisting essentially of WC having an ultra fine grain size below about 0.6 microns.

2. The article of claim 1, wherein said sinter hipping temperature is 1,400 degrees C.

3. The article of claim 1, wherein said grains size is 0.4 microns.

4. The article of claim 1, wherein said transition metal carbide is VC.

5. The article of claim 1, wherein said ferrous metal is cobalt, present in an amount of about 8 to 12% by weight of the composition.

6. The article of claim 1, wherein the transition metal carbide is present in an amount of about 0.5 to 0.8% by weight of the composition.

7. The article of claim 1, wherein said article is a tape slitter knife, said knife comprised of side portions substantially parallel to each other and separated by a sidewall running substantially unbroken therebetween to define a body, said sidewall capable of being sharpened to receive a cutting edge, said cutting edge defining an outer periphery to said knife, and a centrally located aperture extending from one side to the other side of the knife, such that there is an inner periphery to the knife.

* * * * *